US010935652B2

(12) United States Patent
Branson

(10) Patent No.: US 10,935,652 B2
(45) Date of Patent: Mar. 2, 2021

(54) SYSTEMS AND METHODS FOR USING ROAD UNDERSTANDING TO CONSTRAIN RADAR TRACKS

(71) Applicant: GM GLOBAL TECHNOLOGY OPERATIONS LLC, Detroit, MI (US)

(72) Inventor: Elliot Branson, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 255 days.

(21) Appl. No.: 16/018,804

(22) Filed: Jun. 26, 2018

(65) Prior Publication Data

US 2018/0306912 A1 Oct. 25, 2018

(51) Int. Cl.
*G01S 13/72* (2006.01)
*G01S 13/931* (2020.01)

(52) U.S. Cl.
CPC .......... *G01S 13/726* (2013.01); *G01S 13/931* (2013.01); *G01S 2013/9322* (2020.01); *G01S 2013/93271* (2020.01)

(58) Field of Classification Search
CPC .................. G01S 13/726; G01S 13/931; G01S 2013/9322; G01S 2013/93271
USPC ........................................................ 342/159
See application file for complete search history.

(56) References Cited

U.S. PATENT DOCUMENTS

| 5,765,166 | A | * | 6/1998 | Gotfried | G01S 13/726 707/737 |
| 6,229,475 | B1 | * | 5/2001 | Woolley | G01S 13/449 342/159 |
| 8,054,217 | B2 | * | 11/2011 | Bruyere | G01S 7/411 342/179 |
| 8,212,717 | B2 | * | 7/2012 | Bruyere | G01S 13/904 342/179 |
| 8,970,429 | B2 | * | 3/2015 | Pickle | G01S 13/726 342/195 |
| 9,255,988 | B2 | * | 2/2016 | Zeng | G01S 13/9029 |
| 9,469,248 | B2 | * | 10/2016 | Ng-Thow-Hing | G01S 7/24 |
| 10,007,996 | B2 | * | 6/2018 | Paglieroni | G01S 7/411 |
| 2009/0228204 | A1 | * | 9/2009 | Zavoli | G01S 19/49 701/532 |

(Continued)

FOREIGN PATENT DOCUMENTS

EP 3401182 A1 * 11/2018 ............ B60W 40/04

*Primary Examiner* — Vladimir Magloire
*Assistant Examiner* — Alexander L. Syrkin
(74) *Attorney, Agent, or Firm* — Lorenz & Kopf, LLP

(57) ABSTRACT

A processor-implemented method in a vehicle for detecting objects from radar data includes: retrieving radar measurements taken at different periodic time increments; organizing the radar measurements into appropriate time windows; building a sequence cluster of radar measurements wherein the sequence cluster comprises a sliding window the latest time windows of radar measurements; removing noise from the sequence cluster of radar measurements by removing a cluster of radar measurements from the sequence cluster of radar measurements that is contradictory to a road topology map for an area in which the first object is estimated to be situated; and outputting the sequence cluster of radar measurements after removal of contradictory radar measurements as a new cluster of radar measurements.

20 Claims, 8 Drawing Sheets

(56) References Cited

U.S. PATENT DOCUMENTS

| | | | |
|---|---|---|---|
| 2014/0253722 A1* | 9/2014 | Smyth | H04N 5/23296 |
| | | | 348/135 |
| 2014/0278052 A1* | 9/2014 | Slavin | G08G 1/0129 |
| | | | 701/400 |
| 2017/0097412 A1* | 4/2017 | Liu | G01S 13/726 |
| 2017/0341653 A1* | 11/2017 | Kubota | B60W 30/18154 |
| 2018/0174449 A1* | 6/2018 | Nguyen | G08G 1/0104 |
| 2018/0232947 A1* | 8/2018 | Nehmadi | G01S 17/931 |

* cited by examiner

SYSTEMS AND METHODS FOR USING ROAD UNDERSTANDING TO CONSTRAIN RADAR TRACKS

TECHNICAL FIELD

The present disclosure generally relates to object detection and tracking, and more particularly relates to systems and methods in a vehicle for using lane information to constrain radar tracks used in object detection and tracking.

BACKGROUND

Vehicle perception systems have been introduced into vehicles to allow a vehicle to sense its environment and in some cases to allow the vehicle to navigate autonomously or semi-autonomously. Sensing devices that may be employed in vehicle perception systems include radar, lidar, image sensors, and others.

While recent years have seen significant advancements in vehicle perception systems, such systems might still be improved in a number of respects. For example, radar measurements contain noise from static object returns, such as the ground, power lines, manhole covers and the like, and also atmospheric noise. Also, moving objects detected from radar measurements may not appear in a single location. The moving objects can appear to be spread out over a larger region of space. Additionally, background noise may cause positional shifts in objects detected from radar measurements. Consequently, using motion returns alone may not be effective.

Accordingly, it is desirable to provide improved systems and methods for determining returns corresponding to moving objects. Furthermore, other desirable features and characteristics of the present invention will become apparent from the subsequent detailed description and the appended claims, taken in conjunction with the accompanying drawings and the foregoing technical field and background.

SUMMARY

Systems and methods for an enhanced object detection and tracking system in a vehicle are provided. In one embodiment, a processor-implemented method in a vehicle for detecting and tracking objects using radar data includes retrieving, by the processor, radar measurements taken at different periodic time increments by a radar system in the vehicle; organizing, by the processor, the radar measurements as time-ordered clusters of radar measurements into appropriate time windows, wherein the time window into which a time-ordered cluster of the radar measurements is organized corresponds to the time period during which the time-ordered cluster of radar measurements was taken; building, by the processor, a sequence cluster of radar measurements, wherein the sequence cluster includes multiple time-ordered clusters of radar measurements that correspond to a first object and the multiple time-ordered clusters in the sequence cluster are arranged in chronological order, wherein the sequence cluster is arranged as a sliding window of radar measurements and the sliding window includes a predetermined number of the latest time windows of radar measurements. The method further includes removing, by the processor, noise from the sequence cluster of radar measurements by removing a cluster of radar measurements from the sequence cluster of radar measurements that is contradictory to a road topology map for an area in which the first object is estimated to be situated; and outputting the sequence cluster of radar measurements after removal of contradictory radar measurements as a new cluster of radar measurements.

In one embodiment, removing noise from the sequence cluster of radar measurements includes comparing the sequence cluster of radar measurements to the road topology map wherein the road topology map is configured to identify lanes and allowed directions of travel in the identified lanes; and removing radar measurements that indicate object movement in a direction that is contradictory to an allowed direction of travel in the lanes of the road topology map.

In one embodiment, the method further includes: tracking one or more radar tracks using a separate instance of a constrained Kalman filter for each radar track wherein each radar track includes consecutive observations of the same object and wherein the tracking includes enforcing and constraining the movement of the one or more radar tracks within an aligned lane in a manner the aligned lane dictates even when a measurement supporting a movement is missing from the one or more radar tracks; determining if the new cluster of radar measurements may correspond to a detected object aligned within a lane by comparing the new cluster of radar measurements to the radar tracks that are aligned within a lane; and not associating the new cluster of radar measurements with any of the radar tracks if the comparison does not result in the identification of a radar track to which the new cluster may correspond.

In one embodiment, the method further includes: searching in aligned lanes for earlier radar measurements corresponding to the identified radar track that are consistent with the new cluster of radar measurements when the comparison results in the identification of a radar track to which the new cluster may correspond; and associating the new cluster of radar measurements with the identified radar track if the earlier radar measurements corresponding to the identified radar tracks are consistent with the new cluster of radar measurements.

In one embodiment, the method further includes rejecting the new cluster of radar measurements as noise if the earlier radar measurements corresponding to the identified radar tracks are not consistent with the new cluster of radar measurements.

In another embodiment, a processor-implemented method in a vehicle for detecting and tracking objects using radar data includes: tracking one or more radar tracks using a separate instance of a constrained filter for each radar track wherein each radar track includes consecutive observations of the same object and wherein the tracking includes enforcing and constraining the movement of the one or more radar tracks within an aligned lane in a manner the aligned lane dictates even when a measurement supporting a movement is missing from the one or more radar tracks; determining if a new cluster of radar measurements may correspond to a detected object aligned within a lane by comparing the new cluster of radar measurements to the radar tracks that are aligned within a lane; searching in aligned lanes for earlier radar measurements corresponding to the identified radar track that are consistent with the new cluster of radar measurements when the comparison results in the identification of a radar track to which the new cluster may correspond; and associating the new cluster of radar measurements with the identified radar track if the earlier radar measurements corresponding to the identified radar track are consistent with the new cluster of radar measurements.

In one embodiment, the method further includes predicting a future observation for the identified radar track by projecting the future observation along a path dictated by the aligned lane.

In one embodiment, predicting a future observation occurs when an occluding object prevents the vehicle from receiving radar returns from sections of the aligned lane.

In one embodiment, predicting a future observation includes predicting that the detected object may cross another lane.

In one embodiment, predicting a future observation includes predicting that the detected object may turn into another lane due to requirements of the aligned lane.

In one embodiment, the aligned lane includes a turn only lane section.

In one embodiment, the aligned lane includes a merge only lane section.

In one embodiment, the aligned lane includes a no-turn lane section.

In one embodiment, the method further includes generating the new cluster of radar measurements by removing a cluster of radar measurements that is contradictory to a road topology map.

In one embodiment, removing a cluster of radar measurements that is contradictory to a road topology map includes comparing the sequence cluster of radar measurements to the road topology map wherein the road topology map is configured to identify lanes and allowed directions of travel in the identified lanes; and removing radar measurements that indicate object movement in a direction that is contradictory to an allowed direction of travel in the lanes in the road topology map.

In another embodiment, a vehicle includes: a radar system configured to generate radar data; and an object detection system including one or more processors configured by programming instructions in non-transient computer readable media. The object detection system is configured to: retrieve radar measurements taken at different periodic time increments by a radar system in the vehicle; organize the radar measurements into appropriate time windows wherein the time window into which a set of the radar measurements is organized corresponds to the time period during which the set of radar measurements was taken; build a sequence cluster of radar measurements, wherein the sequence cluster includes radar measurements corresponding to a first object in a plurality of different time windows, the sequence cluster includes a sliding window of radar measurements, and the sliding window includes a predetermined number of the latest time windows of radar measurements. The object detection system is further configured to remove noise from the sequence cluster of radar measurements by removing a cluster of radar measurements from the sequence cluster of radar measurements that is contradictory to a road topology map for an area in which the first object is estimated to be situated; and output the sequence cluster of radar measurements after removal of contradictory radar measurements as a new cluster of radar measurements.

In one embodiment, the object detection system is further configured to: compare the sequence cluster of radar measurements to the road topology map wherein the road topology map is configured to identify lanes and allowed directions of travel in the identified lanes; and remove radar measurements that indicate object movement in a direction that is contradictory to an allowed direction of travel in the lanes of the road topology map.

In one embodiment, the vehicle further includes an object tracking system. The object tracking system includes one or more processors configured by programming instructions in non-transient computer readable media. The object tracking system is configured to: track one or more radar tracks using a separate instance of a constrained filter for each radar track wherein each radar track includes consecutive observations of the same object and wherein the tracking includes enforcing and constraining the movement of the one or more radar tracks within an aligned lane in a manner the aligned lane dictates even when a measurement supporting a movement is missing from the one or more radar tracks; determine if a new cluster of radar measurements may correspond to a detected object aligned within a lane by comparing the new cluster of radar measurements to the radar tracks that are aligned within a lane; search in aligned lanes for earlier radar measurements corresponding to the identified radar track that are consistent with the new cluster of radar measurements when the comparison results in the identification of a radar track to which the new cluster may correspond; and associate the new cluster of radar measurements with the identified radar track if the earlier radar measurements corresponding to the identified radar track are consistent with the new cluster of radar measurements.

In one embodiment, the object tracking system is further configured to predict a future observation for the identified radar track by projecting the future observation along a path dictated by the aligned lane.

In one embodiment, the object tracking system is further configured to reject the new cluster of radar measurements as noise if the earlier radar measurements corresponding to the identified radar tracks are not consistent with the new cluster of radar measurements.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
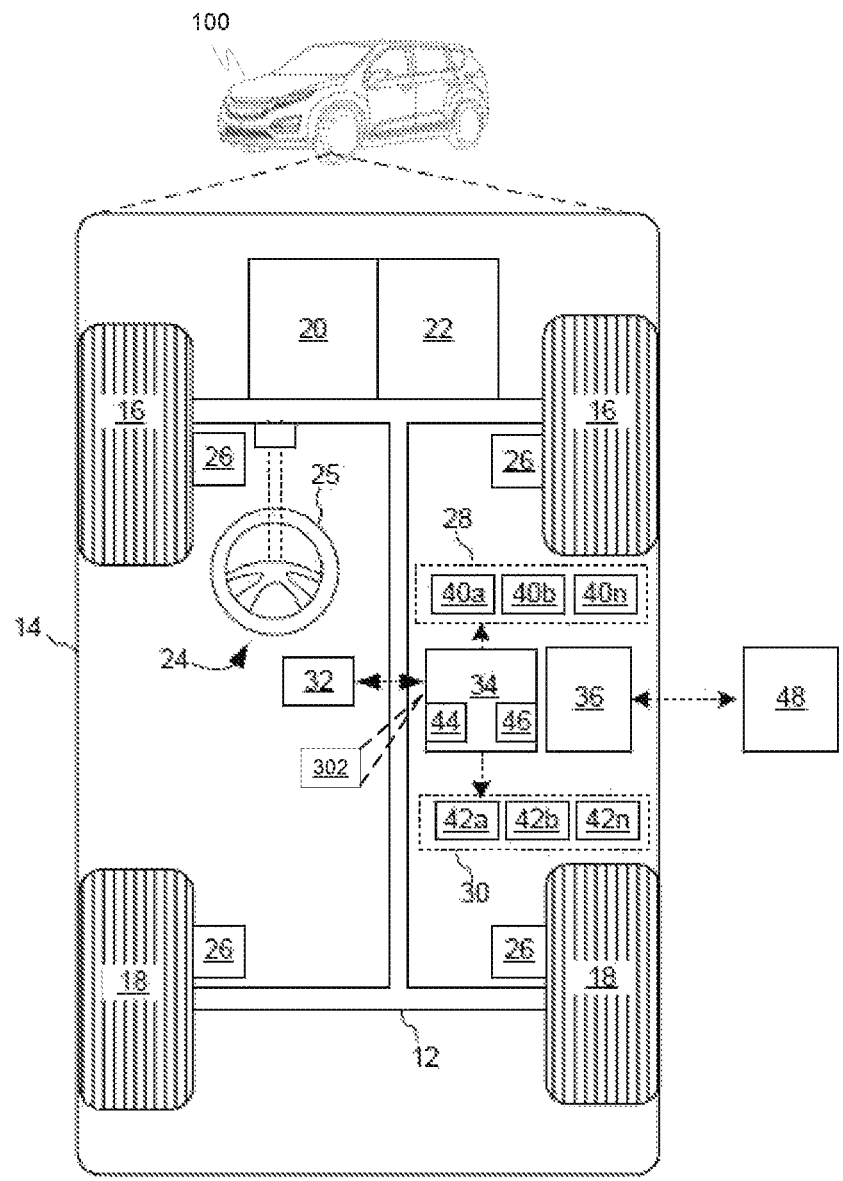
FIG. 1 depicts an example vehicle that includes an object detection and tracking system for use with a radar system, in accordance with various embodiments.

FIG. 1 depicts an example vehicle 100 that includes an object detection and tracking system 302 for use with a radar system. As depicted in FIG. 1, the vehicle 100 generally includes a chassis 12, a body 14, front wheels 16, and rear wheels 18. The body 14 is arranged on the chassis 12 and substantially encloses components of the vehicle 100. The body 14 and the chassis 12 may jointly form a frame. The wheels 16-18 are each rotationally coupled to the chassis 12 near a respective corner of the body 14.

In various embodiments, the vehicle 100 may be an autonomous vehicle or a semi-autonomous vehicle. An autonomous vehicle 100 is, for example, a vehicle that is automatically controlled to carry passengers from one location to another. The vehicle 100 is depicted in the illustrated embodiment as a passenger car, but other vehicle types, including motorcycles, trucks, sport utility vehicles (SUVs), recreational vehicles (RVs), marine vessels, aircraft, etc., may also be used.

In an exemplary embodiment, the vehicle 100 may correspond to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any vehicle in which the present subject matter may be implemented, regardless of its level of autonomy.

As shown, the vehicle 100 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 100 (such as the state of one or more occupants) and generate sensor data relating thereto. Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, vehicle 100 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the vehicle 100. In various embodiments, the data storage device 32 stores defined maps of the navigable environment. In various embodiments, the defined maps may be predefined by and obtained from a remote system. For example, the defined maps may be assembled by the remote system and communicated to the vehicle 100 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 100. In various embodiments, controller 34 is configured to implement a mapping system as discussed in detail below.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the vehicle 100, and generate control signals that are transmitted to the actuator system 30 to automatically control the components of the vehicle 100 based on the logic, calculations, methods, and/or algorithms. Although only one controller 34 is shown in FIG. 1, embodiments of the vehicle 100 may include any number of controllers 34 that communicate over any suitable communication medium or a combination of communication mediums and that cooperate to process the sensor signals, perform logic, calculations, methods, and/or algorithms, and generate control signals to automatically control features of the vehicle 100.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
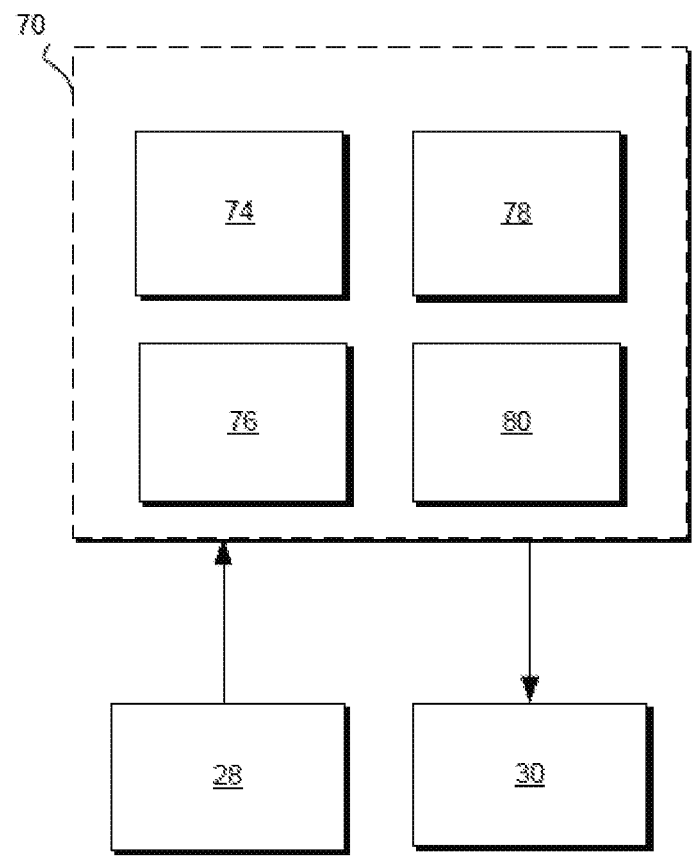
FIG. 2 is a functional block diagram illustrating an autonomous driving system (ADS) associated with an autonomous vehicle, in accordance with various embodiments.

In accordance with various embodiments, controller 34 may implement an autonomous driving system (ADS) 70 as shown in FIG. 2. That is, suitable software and/or hardware components of controller 34 (e.g., processor 44 and computer-readable storage device 46) may be utilized to provide an autonomous driving system 70 that is used in conjunction with vehicle 100.

In various embodiments, the instructions of the autonomous driving system 70 may be organized by function or system. For example, as shown in FIG. 2, the autonomous driving system 70 can include a perception system 74, a positioning system 76, a path planning system 78, and a vehicle control system 80. As can be appreciated, in various embodiments, the instructions may be organized into any number of systems (e.g., combined, further partitioned, etc.) as the disclosure is not limited to the present examples.

In various embodiments, the perception system 74 synthesizes and processes the acquired sensor data and predicts the presence, location, classification, and/or path of objects and features of the environment of the vehicle 100. In various embodiments, the perception system 74 can incorporate information from multiple sensors (e.g., sensor system 28), including but not limited to cameras, lidars, radars, and/or any number of other types of sensors. In various embodiments, all or parts of the object detection and tracking system 302 may be included within the perception system 74.

The positioning system 76 processes sensor data along with other data to determine a position (e.g., a local position relative to a map, an exact position relative to a lane of a road, a vehicle heading, etc.) of the vehicle 100 relative to the environment. As can be appreciated, a variety of techniques may be employed to accomplish this localization, including, for example, simultaneous localization and mapping (SLAM), particle filters, Kalman filters, Bayesian filters, and the like.

The path planning system 78 processes sensor data along with other data to determine a path for the vehicle 100 to follow. The vehicle control system 80 generates control signals for controlling the vehicle 100 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 3:
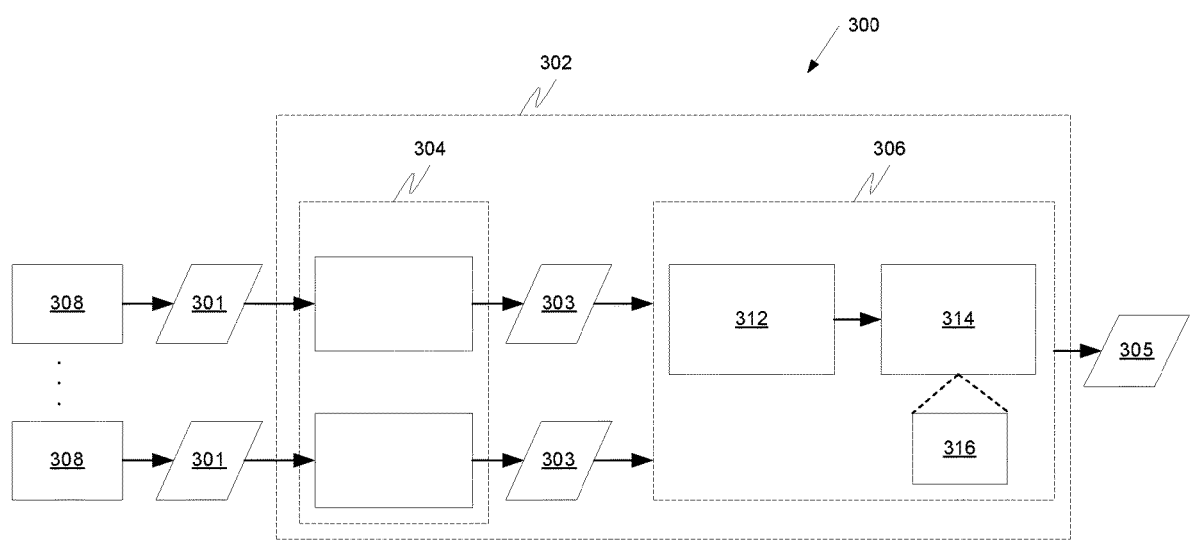
FIG. 3 is a block diagram of an example object detection and tracking system in an example vehicle, in accordance with various embodiments.

FIG. 3 is a block diagram of the object detection and tracking system 302 in more detail in accordance with exemplary embodiments. The example object detection and tracking system 302 is configured to retrieve sensor measurements 301 from radar sensors 308, generate refined measurements 303 for each set of sensor measurements 301 by eliminating measurements that are contradictory to a direction of travel dictated by road lanes, associate the refined measurements 303 with tracked objects, and provide object tracking data 305 to other vehicle systems. The example object detection and tracking system 302 includes a measurement detection system 304 and a tracking and data association system 306. The object detection and tracking system 302 may be implemented on the controller 34 of FIG. 1, on a separate controller, or on a combination of controllers, in various embodiments.

The example measurement detection system 304 is configured to retrieve radar measurements 301 taken at different periodic time increments by radar sensors 308 in the vehicle 300. The radar measurements 301 may include position data, velocity data, signal to noise ratio (SNR) data, power data, etc. for one or more objects during a specific time period. The example measurement detection system 304 is configured to organize the radar measurements as time-ordered clusters of radar measurements into appropriate time windows. The time window into which a time-ordered cluster of radar measurements is organized is determined based on the time period during which the measurements were received.

The example measurement detection system 304 is further configured to build a sequence cluster of radar measurements. The sequence cluster comprises multiple time-ordered clusters of radar measurements that correspond to a common object. The multiple time-ordered clusters in the sequence cluster are arranged in chronological order. The sequence cluster is also arranged as a sliding window of radar measurements. The sliding window of radar measurements in the sequence cluster includes a predetermined number of the latest time windows of radar measurements. In one example, the predetermined number is five, but in other examples the predetermined number of time windows may be different. As a more recent time window of radar measurements is added to the sequence cluster after the predetermined number of time windows has been reached, the oldest time window is removed from the sequence cluster.

Figure 4A:
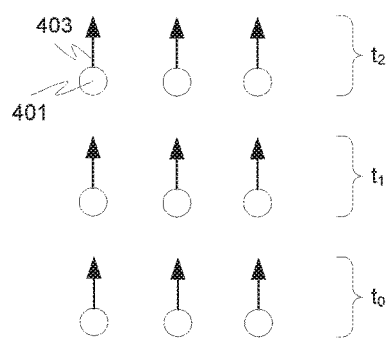
FIG. 4A is a diagram depicting example radar measurements taken at time intervals $t_0$, $t_1$, and $t_2$, in accordance with various embodiments.
Figure 4B:
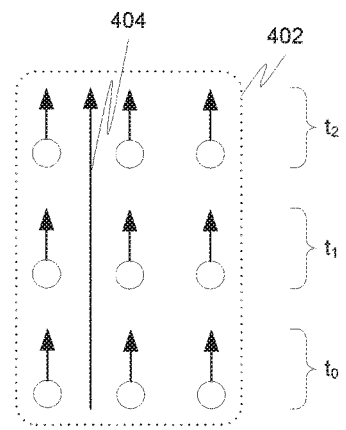
FIG. 4B is a diagram depicting the association of the example radar measurements taken at time intervals $t_0$, $t_1$, and $t_2$ to an example cluster of measurements and a direction of travel for the cluster, in accordance with various embodiments.

FIGS. 4A-4B provide an example illustration of time-ordered clusters of radar measurements and sequence clusters of radar measurements. FIG. 4A is a diagram depicting example radar measurements (including position data 401 and velocity data 403) taken at time intervals $t_0$, $t_1$, and $t_2$. FIG. 4B is a diagram depicting the association of the example radar measurements taken at time intervals $t_0$, $t_1$, and $t_2$ to a sequence cluster 402 and a direction of travel 404 for the sequence cluster 402. As illustrated, the example sequence cluster 402 includes three time-ordered clusters of radar measurements. One cluster corresponds to time window $t_0$, a second cluster corresponds to time window $t_1$, and a third cluster corresponds to time window $t_2$. The multiple (three) clusters in the sequence cluster 402 are arranged in chronological order and the sequence cluster 402 can be arranged as a sliding window of radar measurements.

Referring again to FIG. 3, the example measurement detection system 304 is further configured to remove noise from the sequence cluster of radar measurements corresponding to the common object by removing a cluster of radar measurements from the sequence cluster of radar measurements that is contradictory to a road topology map for an area in which the common object is estimated to be situated. The example measurement detection system 304 is configured to remove noise from the sequence cluster of radar measurements by comparing the sequence cluster of radar measurements to the road topology map. The road topology map is configured to identify lanes and allowed directions of travel in the identified lanes. After the comparison, the example measurement detection system 304 is configured to remove noise by removing radar measurements from the sequence cluster that indicate object movement in a direction that is contradictory to an allowed direction of travel in the lanes of the road topology map. The example measurement detection system 304 is further configured to output the sequence cluster of radar measurements after attempted removal of contradictory radar measurements as a new cluster of radar measurements.

Figure 4C:
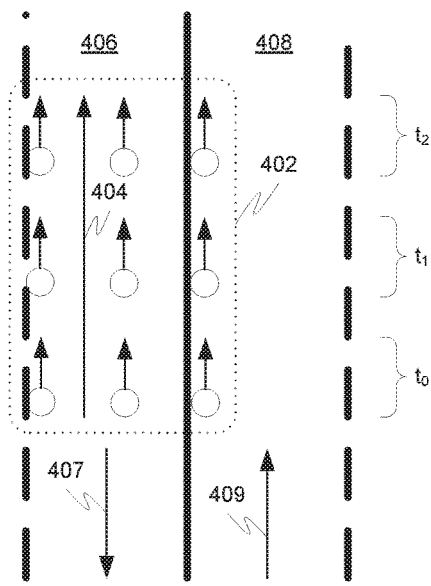
FIG. 4C is a diagram depicting an example overlay of lanes onto the cluster, in accordance with various embodiments.
Figure 4D:
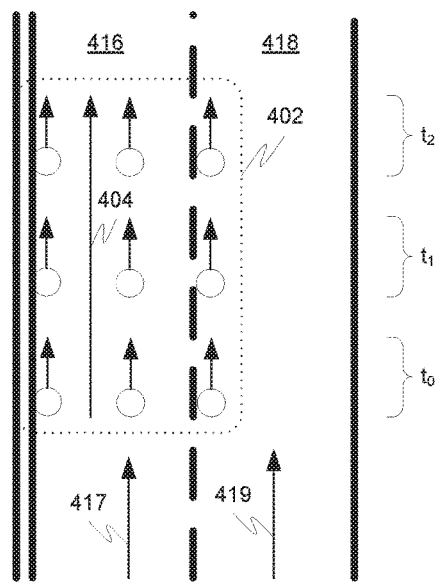
FIG. 4D is a diagram depicting another example overlay of lanes onto the cluster, in accordance with various embodiments.

FIGS. 4C-4D provide an example illustration of the use of road topology by an example measurement detection system 304. FIG. 4C is a diagram depicting the overlay of lanes 406, 408 onto the sequence cluster 402. In this example, the sequence cluster 402 indicates that the direction of travel 404 of the object represented by the radar measurements is in the opposite direction as the allowed direction of travel 407 for lane 406 and in the same direction as the allowed direction of travel 409 for lane 408. Therefore, the radar measurements in lane 406 may comprise noise and may be removed from the sequence cluster 402 of radar measurements.

FIG. 4D is a diagram depicting the overlay of lanes 416, 418 onto the sequence cluster 402. In this example, the sequence cluster 402 indicates that the direction of travel 404 of the object represented by the radar measurements is in the same direction as the allowed direction of travel 417, 419 for lane 416 and for lane 418. Therefore, the object represented by the sequence cluster 402 of radar measurements may be located in lane 416 or 418. In this example, use of a road topology map by itself cannot be used to reduce noise from the sequence cluster 402 of radar measurements.

Figure 5A:
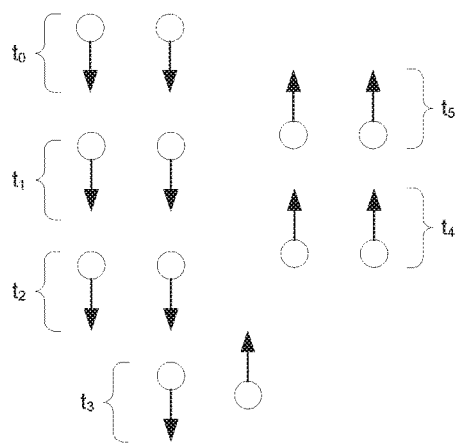
FIG. 5A is a diagram depicting example radar measurements taken at time intervals $t_0$, $t_1$, $t_2$, $t_3$, $t_4$, and $t_5$, in accordance with various embodiments.
Figure 5B:
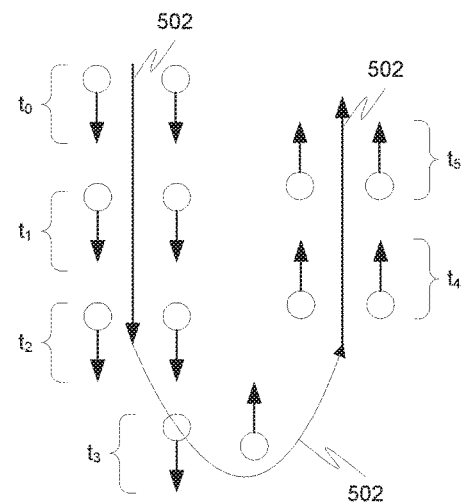
FIG. 5B is a diagram depicting the direction of travel of the example radar measurements taken at time intervals $t_0$, $t_1$, $t_2$, $t_3$, $t_4$, and $t_5$, in accordance with various embodiments.
Figure 5C:
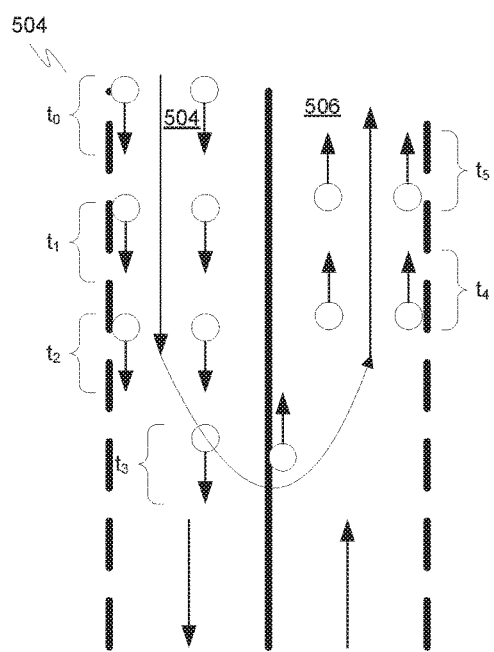
FIG. 5C is a diagram depicting an example overlay of lanes onto the example radar measurements, in accordance with various embodiments.

FIGS. 5A-5C provides another example illustration of the use of road topology by an example measurement detection system 304. FIG. 5A is a diagram depicting example radar measurements taken at time intervals $t_0$, $t_1$, $t_2$, $t_3$, $t_4$, and $t_5$. FIG. 5B is a diagram depicting the direction of travel 502 of the radar measurements taken at time intervals $t_0$, $t_1$, $t_2$, $t_3$, $t_4$, and $t_5$. FIG. 5C is a diagram depicting the overlay of lanes 504, 506 onto the example radar measurements. In this example, the direction of travel of the object represented by the radar measurements is consistent with the allowed direction of travel for lanes 504, 506. Thus, in this example, use of a road topology map by itself cannot be used to reduce noise from the radar measurements.

Referring again to FIG. 3, the example tracking and data association system 306 is configured to further reduce noise in the radar measurements, determine if the radar measurements from the measurement detection system 304 should be associated with one or more radar tracks (wherein each radar track comprises consecutive observations of the same object), track the radar tracks using the radar measurements, and predict future radar measurements using the radar tracks and road topology information. The example tracking and data association system 306 includes a data association module 312 and a tracking module 314.

The example tracking module 314 is configured to track the one or more radar tracks using a separate instance of a constrained filter 316 such as a constrained Kalman filter 316 for each radar track. The example tracking module 314 is configured to perform the tracking through enforcing and constraining the movement of the one or more radar tracks within an aligned lane in a manner the aligned lane dictates even when a measurement supporting a movement is missing from the one or more radar tracks. For example, if a radar track indicates that an object is moving within a road lane (e.g., an aligned lane) and a radar measurement during a time window is not received (e.g., an occluding object prevents a radar measurement concerning the object from being received), the example tracking module 314 via the constrained Kalman filter 316 is configured to predict the position and velocity of the object during the time interval during which the radar measurement was not received based on past kinematics (e.g., velocity, acceleration, time interval, distance traveled, etc.) regarding the object and constraints (e.g., direction of travel, speed limit, turn requirements or restrictions, etc.) placed on object movement by conformity to the rules of the lane. Further, the example tracking module 314 is configured to predict future object movement based on past kinematics and road lane constraints.

The example data association module 312 is configured to determine if a received new cluster of radar measurements corresponds to a detected object that is being tracked (e.g., via the example tracking module 314) and that is aligned within a lane by comparing the new cluster of radar measurements to the radar tracks that are aligned within a lane. If a new cluster of radar measurements does not correspond to an object that is being tracked, then the new cluster could correspond to a new object or it could correspond to noise. The example data association module 312 is further configured to attempt to associate the new cluster of radar measurements to a radar track corresponding to a tracked object when the new cluster of radar measurements appears to correspond to an object that is being tracked.

When attempting to associate the new cluster of radar measurements to a radar track corresponding to a tracked object, the example data association module 312 is configured to search in aligned lanes for earlier radar measurements in earlier time windows corresponding to a radar track that are consistent with the new cluster of radar measurements. The example data association module 312 is further configured to associate the new cluster of radar measurements with the identified radar track if the earlier radar measurements corresponding to the identified radar track are consistent with the new cluster of radar measurements.

Figure 6A:
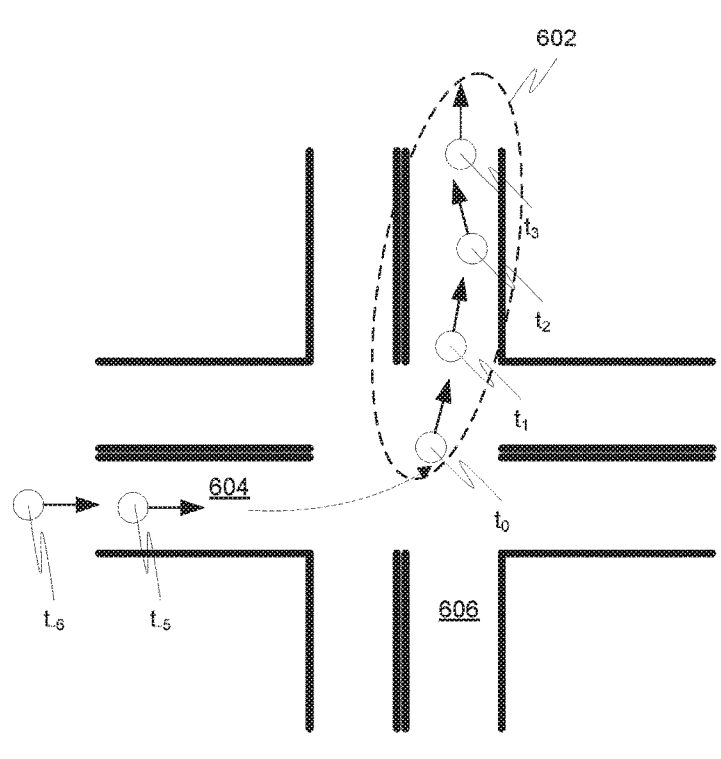
FIG. 6A is a diagram depicting an example cluster of radar measurements taken at time increments $t_0$, $t_1$, $t_2$ and $t_3$ with reference to example aligned lanes, in accordance with various embodiments.
Figure 6B:
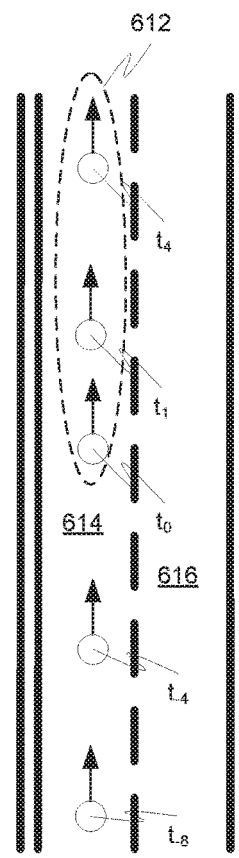
FIG. 6B is a diagram depicting an example cluster of radar measurements taken at time increments $t_0$, $t_1$, and $t_2$ with reference to example aligned lanes, in accordance with various embodiments.

FIGS. 6A and 6B provide examples of earlier radar measurements corresponding to a radar track being consistent with a new cluster of radar measurements. FIG. 6A is a diagram depicting an example cluster 602 of radar measurements taken at time increments $t_0$, $t_1$, $t_2$ and $t_3$ with reference to example aligned lanes. The aligned lanes from which an object represented by the example cluster 602 of radar measurements could have originated include lane 604 and lane 606. The example data association module 312 is configured to search in the aligned lanes. In this example, the example data association module 312 would find that radar measurements from lane 604 taken at time increments $t_{-5}$ and $t_{-6}$, are consistent with (e.g., the movement of an object represented by the radar measurements from lane 604 taken at time increments $t_{-5}$ and $t_{-6}$ could lead to) the example cluster 602 of radar measurements.

FIG. 6B is a diagram depicting an example cluster 612 of radar measurements taken at time increments $t_0$, $t_1$, and $t_2$ with reference to example aligned lanes. The aligned lanes from which an object represented by the example cluster 612 of radar measurements could have originated include lane 614 and lane 616. The example data association module 312 is configured to search in the aligned lanes. In this example, the example data association module 312 would find that radar measurements from lane 614 taken at time increments $t_{-4}$ and $t_{-8}$, are consistent with (e.g., the movement of an object represented by the radar measurements from lane 614 taken at time increments $t_{-4}$ and $t_{-8}$ could lead to) the example cluster 612 of radar measurements.

Figure 7A:
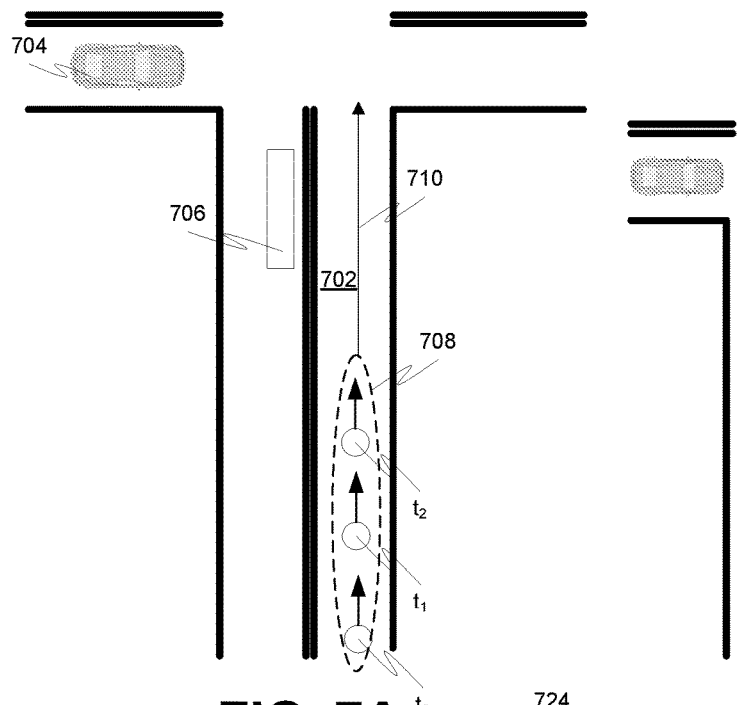
FIG. 7A is a diagram depicting example radar measurements taken at time increments $t_0$, $t_1$, and $t_2$ relating to an object in an example lane, in accordance with various embodiments.
Figure 7B:
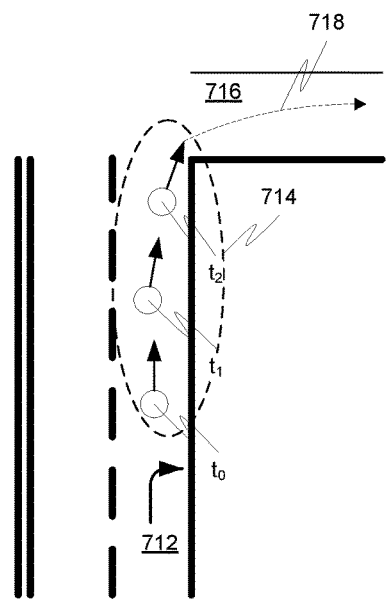
FIG. 7B is a diagram depicting example radar measurements taken at time increments $t_0$, $t_1$, and $t_2$ relating to an object in an example lane, in accordance with various embodiments.
Figure 7C:
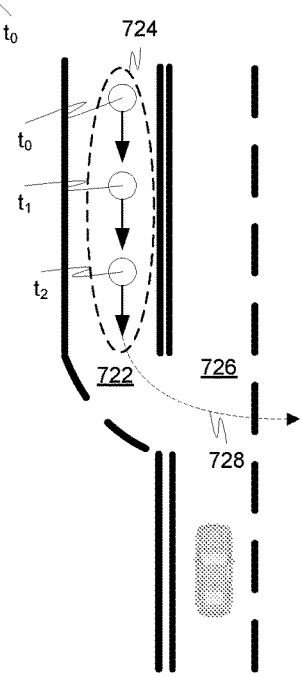
FIG. 7C is a diagram depicting example radar measurements taken at time increments $t_0$, $t_1$, and $t_2$ relating to an object in an example lane, in accordance with various embodiments.

Referring again to FIG. 3, the example tracking and data association system 306 is further configured to predict a future observation for the identified radar track by projecting the future observation along a path dictated by the aligned lane. FIGS. 7A, 7B and 7C provide examples of the projection of a future observation along a path dictated by an aligned lane.

FIG. 7A is a diagram depicting example radar measurements taken at time increments $t_0$, $t_1$, and $t_2$ relating to an object in lane 702. Radar measurements from a vehicle 704 may be blocked from view by an occluding object 706 for a portion of the travel of an object represented by the example radar measurements taken at time increments $t_0$, $t_1$, and $t_2$ along lane 702. The example tracking module 314 is configured to track the radar track 708 represented by the example radar measurements taken at time increments $t_0$, $t_1$, and $t_2$ using a constrained filter such as a constrained Bayesian filter, a constrained Kalman filter 316, a constrained particle filter, an unscented Kalman filter, a filter using long short-term memory (LSTM), a filter using Bayesian inference, or the like. The example tracking module 314 is configured to perform the tracking through enforcing and constraining the movement of the radar track 708 within the aligned lane 702 in a manner the aligned lane dictates even when a measurement supporting a movement is missing from the radar track. In this example, the lane 702 dictates that the object must maintain its current direction of travel. The example tracking module 314 may estimate the projected motion 710 of the object and predict that the object will maintain its current direction of travel in lane 702 and will be positioned around certain points in lane 702 during appropriate time intervals.

FIG. 7B is a diagram depicting example radar measurements taken at time increments $t_0$, $t_1$, and $t_2$ relating to an object in lane 712. The example tracking module 314 is configured to track the radar track 714 represented by the example radar measurements taken at time increments $t_0$, $t_1$, and $t_2$ using a constrained filter 316. The example tracking module 314 is configured to perform the tracking through enforcing and constraining the movement of the radar track 714 in a manner the aligned lane 712 dictates. In this example, the lane 712 is a right turn only lane and therefore the object must make a right turn into lane 716. The example tracking module 314 may estimate the projected motion 718 of the object and predict that the object will make a right turn into lane 716 during an appropriate time interval.

FIG. 7C is a diagram depicting example radar measurements taken at time increments $t_0$, $t_1$, and $t_2$ relating to an object in lane 722. The example tracking module 314 is configured to track the radar track 724 represented by the example radar measurements taken at time increments $t_0$, $t_1$, and $t_2$ using a constrained filter 316. The example tracking module 314 is configured to perform the tracking through enforcing and constraining the movement of the radar track in a manner the aligned lane 722 dictates. In this example, the topology of lane 722 dictates that the object must turn left across lane 726. The example tracking module 314 may estimate the projected motion 728 of the object and predict that the object will cross lane 726 during an appropriate time interval.

Referring again to FIG. 3, the example tracking and data association system 306 is further configured to reject the new cluster of radar measurements as noise if the earlier radar measurements corresponding to the identified radar tracks are not consistent with the new cluster of radar measurements.

Figure 8:
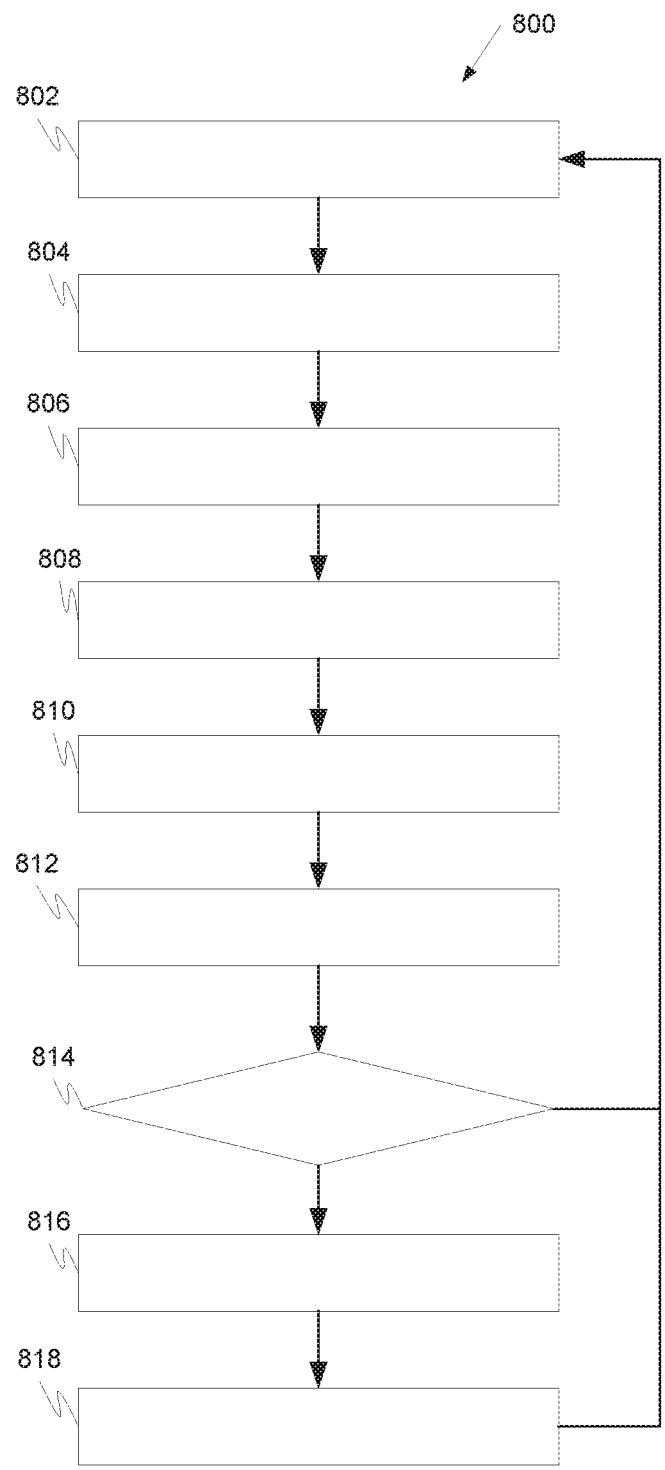
FIG. 8 is a process flow chart depicting an example process for object detection and tracking using radar measurements, in accordance with various embodiments.

FIG. 8 is a process flow chart depicting an example process for object detection and tracking using radar measurements. The order of operation within the method is not limited to the sequential execution as illustrated in the figure, but may be performed in one or more varying orders as applicable and in accordance with the present disclosure. In various embodiments, the method can be scheduled to run based on one or more predetermined events, and/or can run continuously during operation of the vehicle 100.

The example process 800 includes retrieving radar measurements taken at different periodic time increments by a radar system in the vehicle (operation 802). The radar measurements may include position and velocity data for one or more objects during a specific time period. The radar measurements may be retrieved directly from a radar sensor or a network interface.

The example process 800 includes framing the radar measurements in an appropriate time window (operation 804). This may involve organizing the radar measurements into appropriate time windows, wherein the time window into which a set of the radar measurements is organized corresponds to the time period during which the set of radar measurements was taken. The radar measurements may be framed into a sliding window of radar measurements. The sliding window may consist of the latest predetermined number of frames of data. In one example, the predetermined number is five, but other predetermined numbers may also be used.

The example process 800 includes building a sequence cluster of measurements (operation 806). The sequence cluster of measurements should all be related to a common object. The sequence cluster of measurements may include radar measurements corresponding to a common object in a plurality of different time windows. The sequence cluster may include a sliding window of radar measurements wherein the sliding window includes a predetermined number of the latest time windows of radar measurements. In one example, the predetermined number is five, but other predetermined numbers may also be used.

The example process 800 includes referencing lane topology to remove contradictory clusters of radar measurements from a sequence cluster of measurements to generate a new cluster of radar measurements (operation 808). Moving objects may be detected in a noisy radar signal at longer ranges with fewer measurements by referencing lane topology to remove contradictory clusters of radar measurements from a sequence cluster of measurements. Referencing lane topology to remove contradictory clusters of radar measurements from a sequence cluster of measurements may involve removing noise from the sequence cluster of radar measurements corresponding to the common object by removing a cluster of radar measurements from the sequence cluster of radar measurements that is contradictory to a road topology map for an area in which the first object is estimated to be situated. The underlying road and lane information can be used to restrict and remove items, such as noise, from the sequence cluster of measurements. Removing a cluster of radar measurements that is contradictory to a road topology map may include comparing the sequence cluster of radar measurements to a road topology map wherein the road topology map is configured to identify lanes and allowed directions of travel in the identified lanes. Removing a cluster of radar measurements that is contradictory to a road topology map may further include removing radar measurements that indicate object movement in a direction that is contradictory to an allowed direction of travel in the lanes in the road topology map.

The example process 800 includes tracking one or more radar tracks over time using, for example, a separate instance of a constrained filter such as a constrained Kalman filter for each radar track (operation 810). Each radar track includes a sequence of observations of the same object. The tracking may include enforcing and constraining the movement of the one or more radar tracks within an aligned lane in a manner the aligned lane dictates even when a measurement supporting a movement is missing from the one or more radar tracks.

The example process 800 includes referencing a map of detected objects aligned within a lane (operation 812). The map of detected objects aligned within a lane may be referenced to determine if a new cluster of radar measurements may correspond to a detected object aligned within a lane. This may allow objects that are moving within lanes to be detected earlier and have their velocity constrained to be consistent with requirements mandated by the lane.

The example process 800 includes determining if an object was detected (decision 814). By comparing a new cluster of radar measurements to the radar tracks that are aligned within a lane, a determination may be made regarding whether the new cluster of radar measurements correspond to a detected object aligned within a lane. This may allow a search for confirmation that the new cluster represents an object that is moving within a lane and allow a vehicle to quickly react to objects that are moving in this manner.

The example process 800 includes searching a set of aligned lanes to reference previous measurements (operation 816). When the comparison results in the identification of a radar track to which the new cluster may correspond (yes, at decision 814), searching may be performed in aligned lanes for earlier radar measurements corresponding to the identified radar track that are consistent with the new cluster of radar measurements. When the comparison does not result in the identification of a radar track to which the new cluster may correspond (no, at decision 814), the new cluster of radar measurements may not be associated with any of the radar tracks and may be rejected as noise.

The example process 800 includes associating measurements over time to new measurements to existing tracks (operation 818). When the earlier radar measurements corresponding to the identified radar track are consistent with the new cluster of radar measurements, the new cluster of radar measurements may be associated with the identified radar track. This may affirm that an object is moving within a lane and allow the vehicle to predict that the object will continue to move in the future in a manner consistent with the lane requirements. When the earlier radar measurements corresponding to the identified radar track are not consistent with the new cluster of radar measurements, the new cluster of radar measurements may be rejected as noise.

The example process may further include predicting a future observation for the identified radar track by projecting the future observation along a path dictated by the aligned lane. Predicting a future observation may occur when an occluding object prevents the vehicle from receiving radar returns from sections of the aligned lane as illustrated in FIG. 7A. Predicting a future observation may include predicting that the detected object may turn into another lane due to requirements of the aligned lane as illustrated in FIG. 7B. As an example, the aligned lane may comprise a turn only lane section, the aligned lane may comprise a merge only lane section, and/or the aligned lane comprises a no-turn lane section. Predicting a future observation may include predicting that the detected object may cross another lane due to requirements of the aligned lane as illustrated in FIG. 7C.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

As an example, the apparatus, systems, methods, techniques and articles described herein may be applied to measurement systems other than radar systems. The apparatus, systems, methods, techniques and articles described herein may be applied to velocity measurement sensors such as laser or light-based velocity measurement sensors.

What is claimed is:

1. A processor-implemented method in a vehicle for detecting and tracking objects using radar data, the method comprising:
    tracking one or more radar tracks using a separate instance of a constrained filter for each radar track, each radar track comprising consecutive observations of the same object, the tracking comprising enforcing and constraining the movement of the one or more radar tracks within an aligned lane in a manner the aligned lane dictates even when a measurement supporting a movement is missing from the one or more radar tracks;
    determining if a new cluster of radar measurements corresponds to a detected object aligned within a first lane by comparing the new cluster of radar measurements to the radar tracks that are aligned within the first lane;
    when the comparison results in the identification of a radar track to which the new cluster corresponds, searching in aligned lanes, which are different from the first lane, for earlier radar measurements corresponding to the identified radar track that are consistent with the new cluster of radar measurements; and
    associating the new cluster of radar measurements with the identified radar track when the earlier radar measurements corresponding to the identified radar track are consistent with the new cluster of radar measurements.

2. The method of claim 1, further comprising predicting a future observation for the identified radar track by projecting the future observation along a path dictated by the aligned lane.

3. The method of claim 2, wherein predicting a future observation occurs when an occluding object prevents the vehicle from receiving radar returns from sections of the aligned lane.

4. The method of claim 2, wherein predicting a future observation comprises predicting that the detected object may cross another lane.

5. The method of claim 2, wherein predicting a future observation comprises predicting that the detected object may turn into another lane due to requirements of the aligned lane.

6. The method of claim 5, wherein the aligned lane comprises a turn only lane section.

7. The method of claim 5, wherein the aligned lane comprises a merge only lane section.

8. The method of claim 5, wherein the aligned lane comprises a no-turn lane section.

9. The method of claim 1, further comprising generating the new cluster of radar measurements by removing a cluster of radar measurements that is contradictory to a road topology map.

10. The method of claim 9, wherein removing a cluster of radar measurements that is contradictory to a road topology map comprises:
    comparing the sequence cluster of radar measurements to the road topology map, the road topology map configured to identify lanes and allowed directions of travel in the identified lanes; and
    removing radar measurements that indicate object movement in a direction that is contradictory to an allowed direction of travel in the lanes in the road topology map.

11. An object detection system in a vehicle for detecting and tracking objects using radar data, the system comprising a controller configured by programming instructions to:
    track one or more radar tracks using a separate instance of a constrained filter for each radar track, each radar track comprising consecutive observations of the same object, the tracking comprising enforcing and constraining the movement of the one or more radar tracks within an aligned lane in a manner the aligned lane dictates even when a measurement supporting a movement is missing from the one or more radar tracks;
    determine if a new cluster of radar measurements corresponds to a detected object aligned within a first lane by comparing the new cluster of radar measurements to the radar tracks that are aligned within the first lane;
    when the comparison results in the identification of a radar track to which the new cluster corresponds, search in aligned lanes, which are different from the first lane, for earlier radar measurements corresponding to the identified radar track that are consistent with the new cluster of radar measurements; and
    associate the new cluster of radar measurements with the identified radar track when the earlier radar measurements corresponding to the identified radar track are consistent with the new cluster of radar measurements.

12. The object detection system of claim 11, further configured to predict a future observation for the identified radar track by projecting the future observation along a path dictated by the aligned lane.

13. The object detection system of claim 12, further configured to predict a future observation when an occluding object prevents the vehicle from receiving radar returns from sections of the aligned lane.

14. The object detection system of claim 12, further configured to predict that the detected object may cross another lane.

15. The object detection system of claim 12, further configured to predict that the detected object may turn into another lane due to requirements of the aligned lane.

16. The object detection system of claim 15, wherein the aligned lane comprises a turn only lane section.

17. The object detection system of claim 15, wherein the aligned lane comprises a merge only lane section.

18. The object detection system of claim 15, wherein the aligned lane comprises a no-turn lane section.

19. The object detection system of claim 11, further configured to generate the new cluster of radar measurements by removing a cluster of radar measurements that is contradictory to a road topology map.

20. The object detection system of claim 19, wherein to remove a cluster of radar measurements that is contradictory to a road topology map the object detection system is configured to:
   compare the sequence cluster of radar measurements to the road topology map, wherein the road topology map is configured to identify lanes and allowed directions of travel in the identified lanes; and
   remove radar measurements that indicate object movement in a direction that is contradictory to an allowed direction of travel in the lanes in the road topology map.

* * * * *